US012704237B2

(12) United States Patent
Kuttikkattil et al.

(10) Patent No.: US 12,704,237 B2
(45) Date of Patent: Aug. 11, 2026

(54) DEVICE FOR HEATING A VEHICLE COVER

(71) Applicant: HELLA GMBH & CO. KGAA, Lippstadt (DE)

(72) Inventors: Pradeep Kuttikkattil, Palakkad (IN); Paul Rostand Ndjeundoun, Ruesselsheim (DE); Martin Metha Waga, Boeblingen (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 1067 days.

(21) Appl. No.: 17/567,446

(22) Filed: Jan. 3, 2022

(65) Prior Publication Data

US 2022/0128217 A1 Apr. 28, 2022

Related U.S. Application Data

(63) Continuation of application No. PCT/EP2020/067859, filed on Jun. 25, 2020.

(30) Foreign Application Priority Data

Jul. 3, 2019 (DE) .................... 10 2019 117 968.8

(51) Int. Cl.

*F21S 45/60* (2018.01)
*B60S 1/02* (2006.01)
*G01S 7/02* (2006.01)
*G01S 13/931* (2020.01)
*H05B 3/00* (2006.01)
*B60Q 1/00* (2006.01)

(52) U.S. Cl.

CPC .............. *F21S 45/60* (2018.01); *B60S 1/026* (2013.01); *G01S 7/027* (2021.05); *G01S 13/931* (2013.01); *H05B 3/0042* (2013.01); *B60Q 1/0005* (2013.01)

(58) Field of Classification Search

CPC H05B 2203/032; H05B 2214/02; H05B 3/84; H05B 1/0236; H05B 3/0033; H05B 3/0042; H05B 3/20; H05B 6/6482

USPC ................................................ 219/202, 220

See application file for complete search history.

(56) References Cited

U.S. PATENT DOCUMENTS

| | | | | |
|---|---|---|---|---|
| 4,804,247 | A * | 2/1989 | Kyoto ..................... | G02B 6/02 65/432 |
| 8,362,399 | B2 * | 1/2013 | Seaborn .................. | H05B 3/84 219/202 |
| 9,423,087 | B2 * | 8/2016 | Yamamoto ............. | F21S 41/19 |
| 9,784,840 | B2 * | 10/2017 | Pedersen ................ | G01S 17/58 |

(Continued)

FOREIGN PATENT DOCUMENTS

| | | |
|---|---|---|
| CN | 105346365 A | 2/2016 |
| CN | 207893676 U | 9/2018 |

(Continued)

OTHER PUBLICATIONS

International Search Report dated Sep. 22, 2019 in corresponding application PCT/EP2020/067859.

*Primary Examiner* — Chris Q Liu
(74) *Attorney, Agent, or Firm* — Muncy, Geissler, Olds & Lowe, P.C.

(57) ABSTRACT

A device for a vehicle, comprising a cover, a source of electromagnetic heating radiation, which is used to heat the cover, as well as a light guide, through which the heating radiation emerging from the source of electromagnetic heating radiation is guided to the cover.

12 Claims, 1 Drawing Sheet

(56) References Cited

U.S. PATENT DOCUMENTS

| | | | | |
|---|---|---|---|---|
| 9,913,318 | B2 | 3/2018 | Gasworth | |
| 10,351,103 | B2 * | 7/2019 | Yeo | G02B 27/0006 |
| 2014/0151354 | A1 * | 6/2014 | Schauble | B60S 1/54 219/203 |
| 2015/0034621 | A1 * | 2/2015 | Timmermann | H05B 3/84 219/203 |
| 2015/0346328 | A1 * | 12/2015 | Rondeau | G01S 17/58 356/3 |

FOREIGN PATENT DOCUMENTS

| | | | |
|---|---|---|---|
| DE | 102011080489 | A1 | 8/2012 |
| DE | 102011103340 | A1 | 12/2012 |
| DE | 102011079191 | A1 | 1/2013 |
| DE | 102017131441 | A1 | 7/2018 |
| EP | 2828687 | A1 | 1/2015 |
| EP | 3474040 | A2 | 4/2019 |
| JP | 2014104841 | A | 6/2014 |
| WO | WO2016084008 | A1 | 6/2016 |

* cited by examiner

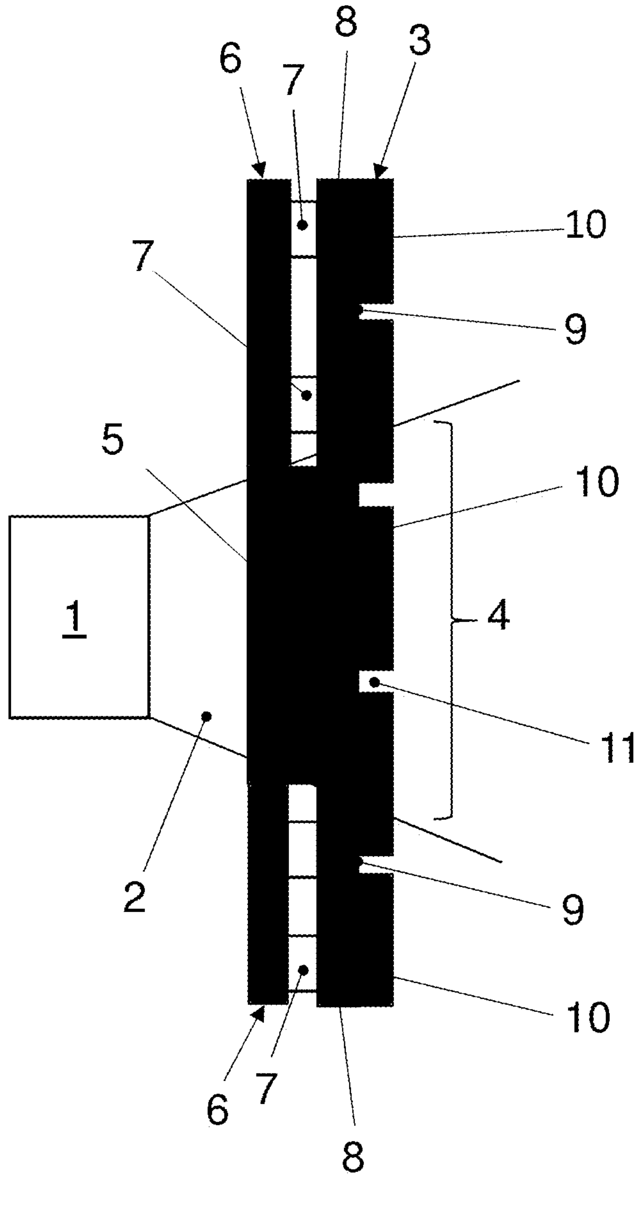
8
3
6
7
10
7
9
5
10
1
4
11
2
9
10
6
7
8

DEVICE FOR HEATING A VEHICLE COVER

This nonprovisional application is a continuation of International Application No. PCT/EP2020/067859, which was filed on Jun. 25, 2020, and which claims priority to German Patent Application No. 10 2019 117 968.8, which was filed in Germany on Jul. 3, 2019, and which are both herein incorporated by reference.

BACKGROUND OF THE INVENTION

Field of the Invention

The present invention relates to a device for heating a cover of a vehicle.

Description of the Background Art

Sensor devices are becoming more and more important in vehicles. They are used, for example, for driver assistance systems or for automatic emergency brake systems. Sensor devices are generally installed in the front area of the vehicle or in the bumper. The sensor devices may be, for example, a radar sensor, which, for design reasons, is provided with a cover referred to as a radome. At low ambient temperatures, the cover may become covered with dew, or an ice layer may form on the cover. The condensation or the ice may interfere with the radar signals.

It is known from the prior art, for example from US 2019/0031147 A1, to provide heating wires in a cover or in the vicinity of a cover to be able to heat the cover. Water or ice situated on the cover may be removed thereby. It has proven to be disadvantageous, in particular, that the heating wires reduce the permeability of electromagnetic radiation used, for example, in radar measurements and may cause interference of the radar signals.

A device of the type mentioned at the outset is known from US 2018/0208028 A1. The device described therein comprises a LIDAR sensor, which is able to emit a laser beam. The device may also comprise a radar sensor instead of a LIDAR sensor. The LIDAR sensor is accommodated in a housing, which includes a cover used as a window, through which the laser beam and the light reflected in the outer area may pass. If the window is misted up or covered with ice, the window may interfere with the LIDAR measurement. In such a case, the device may change the light permeability of the window, for example by applying a voltage to certain areas of the window, so that the absorption of the window material for the laser beam emitted by the LIDAR sensor is increased. As a result, the laser beam is at least partially absorbed by the window, so that the window is heated and freed of water or ice.

SUMMARY OF THE INVENTION

It is therefore an object of the present invention to provide a device in which water or ice situated on a cover may be removed using simple means, in particular without the operability of a possibly present sensor unit being impaired thereby.

According to an exemplary embodiment, it is provided that the device includes a light guide, through which the heating radiation emitted by the source of electromagnetic heating radiation is guided to the cover. By using a light guide, the electromagnetic heating radiation may be easily and effectively applied to the cover for the purpose of removing water or ice on the cover.

It is possible that the cover is a cover of a sensor device or a headlight or a tail light or a part of a front panel or a bumper.

It may be provided that the cover at least partially absorbs the electromagnetic heating radiation used, in particular the cover being made from a material or comprising a material which at least partially absorbs the electromagnetic heating radiation used. In this way, the cover may be heated by applying electromagnetic heating radiation to the cover.

It is possible that the source of electromagnetic heating radiation comprises at least one light-emitting diode, in particular a plurality of light-emitting diodes. For example, the at least one light-emitting diode, in particular the plurality of light-emitting diodes, may emit electromagnetic heating radiation in the red and/or infrared wavelength range, preferably in a wavelength range between 600 nm and 1,100 nm. It is possible to use materials for the cover which at least partially absorb the electromagnetic radiation in this wavelength range.

It may be provided that the light guide is designed as a plate, which is arranged between the at least one light-emitting diode and the cover, in particular arranged on the back side of the cover, the light guide preferably extending in parallel to and abutting the cover. The light guide may be roughened in at least one area, from which the electromagnetic heating radiation is to emerge into the cover. Portions of the electromagnetic heating radiation may be comparatively easily decoupled from a plate, which extends, in particular, in parallel to the cover, into suitable subareas in a targeted manner, so that they strike the cover.

It is possible that the light guide is largely transparent for the electromagnetic heating radiation used, in particular the light guide being made from polycarbonate (PC), polymethyl methacrylate (PMMA), polystyrene (PS) or quartz glass or comprising polycarbonate (PC), polymethyl methacrylate (PMMA), polystyrene (PS) or quartz glass. Materials of this type have only a very low absorption capacity in the wavelength range between 600 nm and 1,100 nm, so that radiation of this type diffuses largely without loss in the light guide. The light guide is thus not heated by the heating radiation.

It may be provided that the device includes a sensor unit, which may emit and/or receive electromagnetic radiation, in particular electromagnetic radiation emitted by the sensor unit and/or received by the sensor unit passing through the cover during the operation of the device. In this case, the device simultaneously acts as a sensor device. By using a light guide or by dispensing with heating wires integrated into the cover or arranged on the cover, a removal of water or ice on the cover may be carried out without reducing the permeability of the electromagnetic radiation used by the sensor unit or causing an interference of the signals.

The source of electromagnetic heating radiation may be situated at a distance from the sensor unit. The wavelength of the electromagnetic heating radiation may be adapted thereby to the properties, in particular to the absorption properties, of the cover, so that the permeability of the cover does not have to be changed in an additional work step, as is the case in the prior art according to US 2018/0208028 A1, which is incorporated herein by reference.

It may be provided that the sensor unit is a radar unit. In particular, the electromagnetic radiation emitted by the sensor unit and/or received by the sensor unit may be a radiation in the microwave range, preferably a radiation in a wavelength range between 1 mm and 100 mm. If heating radiation in the near infrared range of, for example, up to 1,100 nm is used, the radiation generated and/or received by the sensor unit, on the one hand, and the radiation used for heating the cover, on the other hand, differ from each other significantly such that no or only very little interference may occur between the radiations.

The cover may be largely transparent for the electromagnetic radiation emitted by the sensor unit and/or received by the sensor unit, in particular the cover being made from a material or comprising a material which is largely transparent for the electromagnetic radiation emitted by the sensor unit and/or received by the sensor unit.

It is possible that the device comprises a housing, in which the sensor unit is at least partially accommodated, the cover at least partially closing the housing. The cover and/or the housing may be designed as a radome.

It may be provided that the device comprises at least one light source, by which, during the operation of the device, visible light may be generated, which may emerge from the device, in particular through at least one light outlet opening in the cover. This light source may, for example, additionally effectuate light effects for the purpose of enhancing the appearance of the device.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the sole figure shows a schematic sectional view of a device according to the invention.

DETAILED DESCRIPTION

The specific embodiment of a device according to the invention illustrated in the figures used as a sensor device and comprises a sensor unit 1, which is designed, for example, as a radar unit. Sensor unit 1 may emit and/or receive electromagnetic radiation 2. Radiation 2 may be, for example, radiation in a wavelength range between 1 mm and 100 mm.

The device further comprises a housing, of which only front cover 3 is shown. Radiation 2 emitted by sensor unit 1 emerges from the housing through cover 3. The conical area, in particular the radar cone, in which radiation 2 diffuses, is indicated by reference numeral 4.

The device comprises a base plate 5, through which radiation 2 passes before it strikes cover 3. The base plate is surrounded by a circuit board 6, on which a plurality of light-emitted diodes 7 are arranged. Instead of a circuit board 6, multiple circuit boards 6 may also be provided. Instead of multiple light-emitting diodes 7, only one single light-emitting diode 7 may also be provided.

Electromagnetic heating radiation 8 emitted by light-emitting diodes 7 may be, for example, radiation in a wavelength range between 600 nm and 1,100 nm. Heating radiation 8 diffuses to the right in FIG. 1 and enters a light guide 9, which is arranged between light-emitting diodes 7 and cover 3.

Light guide 9 is designed as a thin plate, which abuts the inner side or the side of cover 3 facing sensor unit 1. Light guide 9 is largely transparent for electromagnetic heating radiation 8 used and is made from, in particular, polycarbonate (PC), polymethyl methacrylate (PMMA), polystyrene (PS) or quartz glass or comprises polycarbonate (PC), polymethyl methacrylate (PMMA), polystyrene (PS) or quartz glass.

Heating radiation 8 emitted by light-emitting diodes 7 is coupled into light guide 9 and guided thereby along the back side of cover 3 in parallel to cover 3. Some areas 10 of the light guide are roughened on the outer side or the side facing the cover 3, so that heating radiation 8, may emerge from light guide 9 in these areas 10 and strike the cover. Cover 3 is at least partially impermeable for the wavelength of heating radiation 8 used, so that heating radiation 8 emerging from areas 10 is absorbed locally by the cover. This results in the heating of cover 3.

In the illustrated exemplary embodiment, cover 3 includes through-openings 11 for visible light, which may be generated by light sources which are not illustrated, in particular for light-emitting diodes, which emit visible light. This visible light may enhance the outer appearance of the device.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for heating a cover of a vehicle, the device comprising:
- a cover;
- a source providing electromagnetic heating radiation, which is used to heat the cover; and
- a light guide, the electromagnetic heating radiation emitted by the source of the electromagnetic heating radiation being coupled into the light guide and guided through the light guide to the cover,
- wherein the source of the electromagnetic heating radiation comprises at least one light-emitting diode, and
- wherein the light guide is designed as a plate, which is arranged between the at least one light-emitting diode and the cover, the light guide being arranged on a back side of the cover, and wherein the light guide abuts the cover.

2. The device according to claim 1, wherein the cover is a cover of a sensor device or a headlight or a tail light or a part of a front panel or a bumper.

3. The device according to claim 1, wherein the cover is made from a material or comprises a material which at least partially absorbs the electromagnetic heating radiation.

4. The device according to claim 1, wherein the at least one light-emitting diode is able to emit electromagnetic heating radiation in a red or infrared wavelength range in a wavelength range between 600 nm and 1100 nm.

5. The device according to claim 1, wherein the light guide is roughened in at least one area, from which the electromagnetic heating radiation is to emerge into the cover.

6. The device according to claim 1, wherein the light guide is transparent for the electromagnetic heating radiation, and wherein the light guide is made from polycarbonate, polymethyl methacrylate, polystyrene or quartz glass, or comprises polycarbonate, polymethyl methacrylate, polystyrene or quartz glass.

7. The device according to claim 1, further comprising a sensor unit, which emits or receives electromagnetic radiation, such that the electromagnetic radiation emitted by the sensor unit or received by the sensor unit passes through the cover during the operation of the device.

8. The device according to claim 7, wherein the source of the electromagnetic heating radiation is situated at a distance from the sensor unit.

9. The device according to claim 7, wherein the sensor unit is a radar unit.

10. The device according to claim 7, wherein the electromagnetic radiation emitted by the sensor unit or received by the sensor unit is a radiation in the microwave range having a wavelength range between 1 mm and 100 mm.

11. The device according to claim 7, wherein the cover is made from a material or comprises a material which is transparent for the electromagnetic radiation emitted by the sensor unit or received by the sensor unit.

12. The device according to claim 7, further comprising a housing, in which the sensor unit is at least partially accommodated, wherein the cover at least partially closes the housing.

* * * * *